US012475989B2

(12) United States Patent
Flexman et al.

(10) Patent No.: US 12,475,989 B2
(45) Date of Patent: Nov. 18, 2025

(54) IMAGE SELECTION FOR PRESENTATION (71) Applicant: KONINKLIJKE PHILIPS N.V., Eindhoven (NL)

(72) Inventors: Molly Lara Flexman, Melrose, MA (US); Ashish Sattyavrat Panse, Burlington, MA (US); Grzegorz Andrzej Toporek, Cambridge, MA (US); Jochen Kruecker, Andover, MA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 233 days.

(21) Appl. No.: 18/266,683

(22) PCT Filed: Dec. 14, 2021

(86) PCT No.: PCT/EP2021/085575
§ 371 (c)(1),
(2) Date: Jun. 12, 2023

(87) PCT Pub. No.: WO2022/128972
PCT Pub. Date: Jun. 23, 2022

(65) Prior Publication Data
US 2024/0047043 A1 Feb. 8, 2024

Related U.S. Application Data

(60) Provisional application No. 63/126,226, filed on Dec. 16, 2020.

(51) Int. Cl.
*G16H 30/20* (2018.01)
*G06V 10/774* (2022.01)
*G16H 50/20* (2018.01)

(52) U.S. Cl.
CPC ............ *G16H 30/20* (2018.01); *G16H 50/20* (2018.01); *G06V 10/774* (2022.01); *G06V 2201/03* (2022.01)

(58) Field of Classification Search
None
See application file for complete search history.

(56) References Cited

U.S. PATENT DOCUMENTS

| 9,962,124 B2 | 5/2018 | Najarian et al. |
| 11,403,509 B2 | 8/2022 | Donsbach et al. |

(Continued)

OTHER PUBLICATIONS https://www.acr.org/-/media/ACR/Files/Practice-Parameters/Reporting-Archiv.pdf, downloaded from Internet Jun. 9, 2023.

(Continued)

*Primary Examiner* — Robert A Sorey (57) ABSTRACT

A controller (150) for selecting images for presentation includes a memory (151), a processor (152) and a receiver. The memory (151) stores instructions. The processor (152) executes the instructions. The receiver receives a stream of a plurality of images. When executed by the processor (152), the instructions cause the controller (150) to apply trained artificial intelligence to the plurality of images and generate, based on the trained artificial intelligence, a 1-dimensional stream of a plurality of values corresponding respectively to the plurality of images. Each of the plurality of values of the 1-dimensional stream indicates a significance of a corresponding image of the plurality of images according to the trained artificial intelligence. The instructions also cause the controller (150) to output the plurality of values of the 1-dimensional stream for display with the plurality of images.

20 Claims, 7 Drawing Sheets

(56) References Cited

U.S. PATENT DOCUMENTS

| | | |
|---|---|---|
| 11,657,087 B2 | 5/2023 | Habbecke et al. |
| 2009/0306500 A1* | 12/2009 | Rahn ..................... G16H 30/40 600/431 |
| 2019/0096062 A1 | 3/2019 | Westerhoff et al. |
| 2019/0286652 A1* | 9/2019 | Habbecke ........... G06F 16/7837 |
| 2020/0185084 A1 | 6/2020 | Syeda-Mahmood et al. |
| 2021/0272286 A1 | 9/2021 | Davies et al. |
| 2021/0303968 A1* | 9/2021 | Donsbach .............. G06N 3/084 |
| 2024/0112450 A1* | 4/2024 | Shintani ............... G06V 10/776 |

OTHER PUBLICATIONS

International Search report and Written Opinion of PCT/EP2021/085575, dated Mar. 29, 2022.

\* cited by examiner

IMAGE SELECTION FOR PRESENTATION

CROSS-REFERENCE TO PRIOR APPLICATIONS

This application is the U.S. National Phase application under 35 U.S.C. § 371 of International Application No. PCT/EP2021/085575, filed on Dec. 14, 2021, which claims the benefit of U.S. Provisional Patent Application Ser. No. 63/126,226, filed on Dec. 16, 2020. These applications are hereby incorporated by reference herein.

BACKGROUND

Interventional medical procedures are medical procedures that involve interventions within humans, such as in blood vessels, using interventional medical devices such as needles and catheters. Interventional medical procedures often involve imaging by a medical imaging system such as an X-ray imaging system or an ultrasound imaging system. Medical images may document intraoperative device position as well as final device position for devices inserted permanently or long-term. Medical images may also document size and location of cavities, as well as communication with adjacent structures as delineated when contrast material is injected.

Archiving of medical images captured by the medical imaging systems may be important for a variety of different reasons, such as to document and improve medical care and for use in research. For example, some X-ray fluoroscopy systems will automatically save all X-ray fluoroscopy images, but the volume of data becomes prohibitive given that the technician or clinician must then review thousands of images per case. Typically, a large amount of X-ray fluoroscopy images are not relevant for review, since many X-ray fluoroscopy images are analogous to practice images used to help with positioning, preparation, and navigation. Some X-ray fluoroscopy systems provide a tool for a technician or clinician to selectively manually save X-ray fluoroscopy images, but the technician or clinician may have to stop the workflow in order to select the last set of captured X-ray fluoroscopy images for archiving. Often, a technician or clinician may forget to save some of the relevant images.

A panel on a known controls system for a medical imaging system may show image thumbnails that each represent a saved series of medical images. Each saved series may include a stack of one or more frames. A user interaction using the panel may involve a technician or clinician reviewing series and frames and 'flagging' the series and frames to indicate importance. Once flagging has occurred, certain actions can be performed that only use the flagged images, such as pushing only flagged images to the archiving system that archives medical images from the medical imaging system.

As described above, in known systems images are not always automatically saved, but even if images are automatically saved, a challenge arises in sorting through the images to correctly identify image series and frames that are relevant.

SUMMARY

According to an aspect of the present disclosure, a controller for selecting images for presentation includes a memory, a processor and a receiver. The memory stores instructions. The processor executes the instructions. The receiver receives a stream of a plurality of images. When executed by the processor, the instructions cause the controller to apply trained artificial intelligence to the plurality of images and generate, based on the trained artificial intelligence, a 1-dimensional stream of a plurality of values corresponding respectively to the plurality of images. Each of the plurality of values of the 1-dimensional stream indicates a significance of a corresponding image of the plurality of images according to the trained artificial intelligence. The instructions also cause the controller to output the plurality of values of the 1-dimensional stream for display with the plurality of images.

According to another aspect of the present disclosure, a system for selecting images for presentation includes a system computer with a receiver, a memory and a processor. The memory stores instructions. The processor executes the instructions. When executed by the processor, the instructions cause the system to receive, via the receiver, a stream of a plurality of images and apply trained artificial intelligence to the plurality of images. The instructions also cause the system to generate, based on the trained artificial intelligence, a 1-dimensional stream of a plurality of values corresponding respectively to the plurality of images. Each of the plurality of values of the 1-dimensional stream indicates a significance of a corresponding image of the plurality of images according to the trained artificial intelligence. The instructions also cause the system to output the plurality of values of the 1-dimensional stream for display with the plurality of images.

According to yet another aspect of the present disclosure, a method for selecting images for presentation includes receiving, by a controller that includes a memory that stores instructions and a processor that executes the instructions, a stream of a plurality of images. The method also includes applying trained artificial intelligence to the plurality of images. The method further includes generating, based on the trained artificial intelligence, a 1-dimensional stream of a plurality of values corresponding respectively to the plurality of images. Each of the plurality of values of the 1-dimensional stream indicates a significance of a corresponding image of the plurality of images according to the trained artificial intelligence. The method moreover includes outputting the plurality of values of the 1-dimensional stream for display with the plurality of images.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

In the following detailed description, for the purposes of explanation and not limitation, representative embodiments disclosing specific details are set forth in order to provide a thorough understanding of an embodiment according to the present teachings. Descriptions of known systems, devices, materials, methods of operation and methods of manufacture may be omitted so as to avoid obscuring the description of the representative embodiments. Nonetheless, systems, devices, materials and methods that are within the purview of one of ordinary skill in the art are within the scope of the present teachings and may be used in accordance with the representative embodiments. It is to be understood that the terminology used herein is for purposes of describing particular embodiments only and is not intended to be limiting. The defined terms are in addition to the technical and scientific meanings of the defined terms as commonly understood and accepted in the technical field of the present teachings.

It will be understood that, although the terms first, second, third etc. may be used herein to describe various elements or components, these elements or components should not be limited by these terms. These terms are only used to distinguish one element or component from another element or component. Thus, a first element or component discussed below could be termed a second element or component without departing from the teachings of the inventive concept.

The terminology used herein is for purposes of describing particular embodiments only and is not intended to be limiting. As used in the specification and appended claims, the singular forms of terms 'a', 'an' and 'the' are intended to include both singular and plural forms, unless the context clearly dictates otherwise. Additionally, the terms "comprises", and/or "comprising," and/or similar terms when used in this specification, specify the presence of stated features, elements, and/or components, but do not preclude the presence or addition of one or more other features, elements, components, and/or groups thereof. As used herein, the term "and/or" includes any and all combinations of one or more of the associated listed items.

Unless otherwise noted, when an element or component is said to be "connected to", "coupled to", or "adjacent to" another element or component, it will be understood that the element or component can be directly connected or coupled to the other element or component, or intervening elements or components may be present. That is, these and similar terms encompass cases where one or more intermediate elements or components may be employed to connect two elements or components. However, when an element or component is said to be "directly connected" to another element or component, this encompasses only cases where the two elements or components are connected to each other without any intermediate or intervening elements or components.

The present disclosure, through one or more of its various aspects, embodiments and/or specific features or sub-components, is thus intended to bring out one or more of the advantages as specifically noted below. For purposes of explanation and not limitation, example embodiments disclosing specific details are set forth in order to provide a thorough understanding of an embodiment according to the present teachings. However, other embodiments consistent with the present disclosure that depart from specific details disclosed herein remain within the scope of the appended claims. Moreover, descriptions of well-known apparatuses and methods may be omitted so as to not obscure the description of the example embodiments. Such methods and apparatuses are within the scope of the present disclosure.

As described herein, image selection for presentation may provide for improved efficiencies when large volumes of images are generated, such as by medical imaging systems that generate medical images intraoperatively during an interventional procedure. Image selection for presentation may provide for archiving of relevant images required for patient records, relevant images appropriate for research purposes, relevant images that will enhance standardization within institutions, and relevant images usable for education. Application of trained artificial intelligence to image frames for automatically rating the image frames with a significance value may improve user interfaces used to sort through data and may alleviate reporting burdens. Additionally, as described below, image selection for presentation may provide a recommendation system that takes inputs such as user characteristics, type of interventional system, procedure, and/or identity or type of institution in order to enhance the process of image selection by assisting in understanding frame significance.

Figure 1:
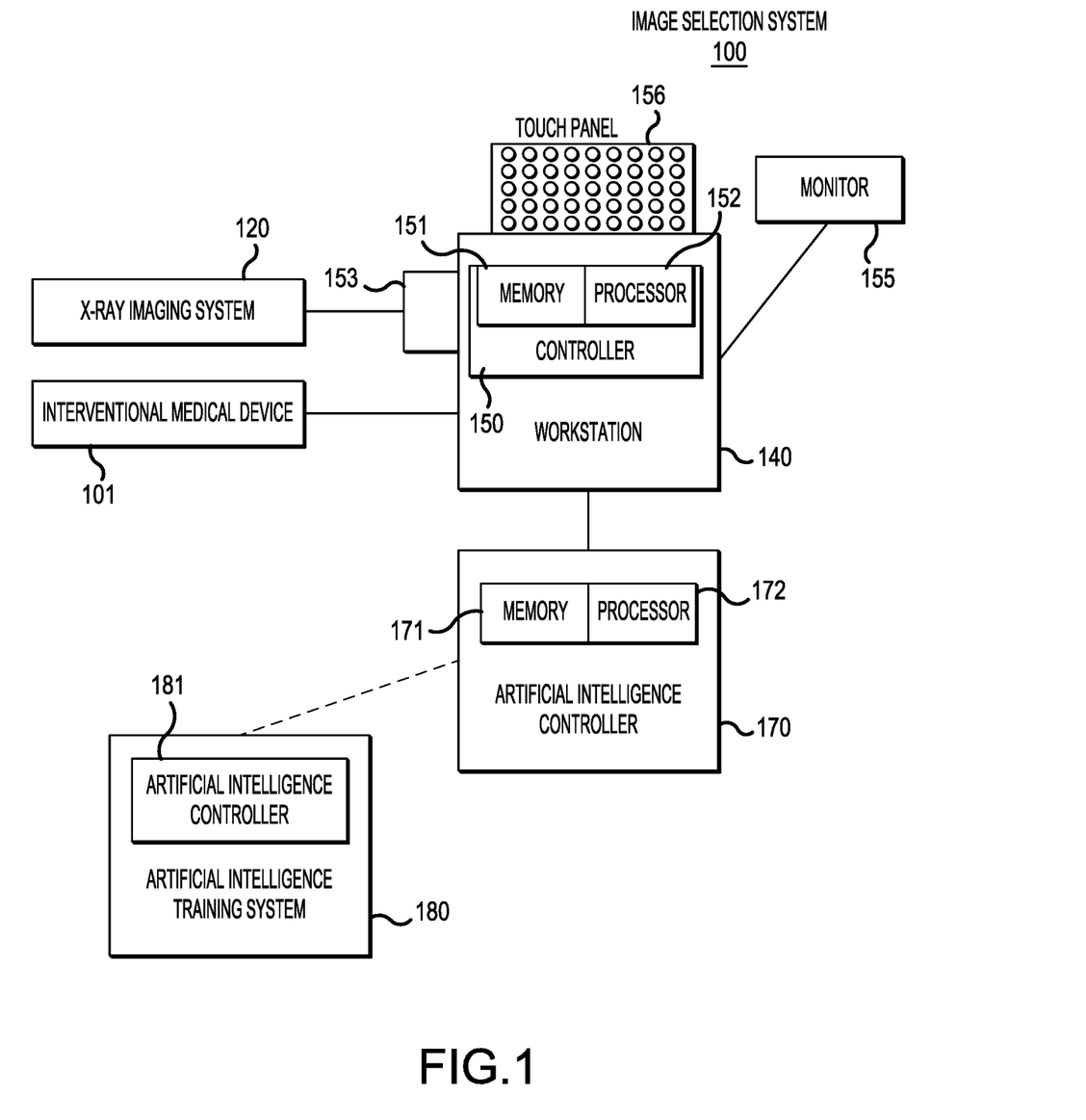
FIG. 1 illustrates a system for image selection for presentation, in accordance with a representative embodiment.

FIG. 1 illustrates a system for image selection for presentation, in accordance with a representative embodiment.

In FIG. 1, an image selection system 100 includes an X-ray imaging system 120, a workstation 140, an AI controller 170 and an AI training system 180. The X-ray imaging system 120 captures medical images that include imagery of an interventional medical device 101. Examples of the X-ray imaging system 120 include a fixed C-arm X-ray system such as Azurion from Philips Corporation or a mobile X-ray system such as Veradius from Philips Corporation. The X-ray imaging system 120 is a medical apparatus that generates a plurality of images during an interventional medical procedure, and may include an X-ray tube adapted to generate X-rays and an X-ray detector configured to acquire X-ray images.

The workstation 140 includes a controller 150, an interface 153, a monitor 155 and a touch panel 156. The controller 150 includes a memory 151 that stores instructions and a processor 152 that executes the instructions.

The AI controller 170 includes a memory 171 that stores instructions and a processor 172 that executes the instructions. The AI controller 170 may dynamically implement trained artificial intelligence based on images received by the workstation 140 from the X-ray imaging system 120. In an embodiment, the AI controller 170 is integrated with the workstation 140. In another embodiment, functionality of the AI controller 170 as described herein may be performed by the controller 150. The AI controller 170 may include a neural network computer configured to receive a stream of a plurality of images from a system computer implemented by the workstation 140, and apply the trained artificial intelligence to the plurality of images, generate a 1-dimensional stream of a plurality of values and provide the 1-dimensional stream to the system computer implemented by the workstation 140. The AI controller 170 may determine and adjust the values of the 1-dimensional stream of the plurality of values based on significance of each image of the stream of the plurality of images. The significance of the images may be determined according to a standardized metric that may be applied across different clinical sites and users. The metric used to determine the significance may vary based on the context in which the images are being analyzed. For example, the metric vary based on subject matter being sought as triggers in the images, and the subject matter may include medical instruments, anatomical structures, motion(s), or presence of people. The significance metric may be determined by experts in the field(s) in which the artificial intelligence described herein is applied. Accordingly, the significance may be appropriately termed a contextual significance that reflects the context of the subject matter in the images deemed significant. The significance may be appropriately termed a predetermined significance that reflects significance previously set for the images that will be deemed significant. The significance may be appropriately termed a standardized significance that reflects significance set as a standard for a particular type of subject matter. The significance may be appropriately described in other terms consistent with the descriptions herein.

The workstation 140 may match the 1-dimensional stream to the plurality of images, and output the 1-dimensional stream to the monitor 155. The monitor 155 may be configured to display visual representations of the 1-dimensional stream of the plurality of values with images from the plurality of images.

The AI training system 180 includes an AI training controller 181. The AI training controller 181 may include a memory (not shown) that stores instructions and a processor (not shown) that executes the instructions. The AI training system 180 may train artificial intelligence as described herein, and provide the trained artificial intelligence to the AI controller 170 and/or the workstation 140 in FIG. 1. The AI training system 180 may include a neural network computer configured to train the trained artificial intelligence.

When executed by the processor 152, the instructions from the memory 151 cause the controller 150 to perform some or all aspects of methods described herein. The controller 150 may be a data processing controller that is configured to receive consecutive fluoroscopy images from the X-ray imaging system 120. The fluoroscopy images may be images that are generated and stored by the X-ray imaging system 120 during a clinical procedure. The fluoroscopy images may be further enhanced by other information from the X-ray imaging system 120 such as a C-arm position, radiation dose, identification of procedure phase, identification of the interventional medical device 101 in the image, image generation settings, type of scanning protocol type, as well as patient characteristics including information from the patient's electronic medical record (EMR).

The interface 153 interfaces the workstation 140 to the X-ray imaging system 120. The interface 153 may include a receiver that receives a stream of a plurality of images from the X-ray imaging system 120. For example, the interface 153 may be a port or an adapter that accepts a cable line from the X-ray imaging system 120.

The monitor 155 displays images generated by the X-ray imaging system 120. The monitor 155 may also display interactive instructions for a clinician using the image selection system 100.

The touch panel 156 accepts touch instructions from a clinician, such as instructions input via a mouse or keyboard. The touch panel 156 may also accept touch input such as via a soft keyboard or keypad.

The workstation 140 may receive time-series interventional X-ray images such as fluoroscopy X-ray images from the X-ray imaging system 120. The workstation 140 may also receive exposure information, digital subtraction angiography (DSA) information, and other system information such as C-arm position, radiation settings and table position. The workstation 140 applies trained artificial intelligence to the X-ray images and outputs a 1-dimensional sequence of indicators of frame significance for each X-ray image. The frame significance may be predicted by a machine learned model such as a deep neural network or variation based on one or more of the X-ray images, as well as contextual information such as the system information of the X-ray imaging system 200. The indicators may be values representing significance, and may be used to change a user interface displayed on the monitor 155 to only display the most significant (e.g., relevant, important) frames and reject the least significant (e.g., irrelevant, unimportant) frames for which significance is below a predetermined threshold. The predetermined threshold may be tunable and may include more than one thresholds. As a result, image saving by the workstation 140 may be provided in an auto-saving mode once the workstation 140 is trusted to properly recognize the most significant frames.

The monitor 155 may display a variable speed scroll-bar or movie to replay all frames including the indicators. The acquired image series may be displayed on the monitor 155 augmented with a heat map or bar graph showing the 1-dimensional time-series significance. The controller 150 may control the monitor 155 to order the image series or frames by similarity and significance. The controller 150 may also create a movie for an interventional medical procedure that plays the most relevant frames and frame sequences and has a variable speed depending on the significance of the images. The most significant frames or series of frames may be auto-saved or auto-flagged. Auto-saving or auto-flagging may be provided for image series or frames with significance above a tunable threshold set as a default or tuned by a clinician.

According to another aspect of image selection for presentation, the image selection system 100 in FIG. 1 may be used to customize the 1-dimensional time-series significance indicators based on user characteristics and/or characteristics of the image source. A deep learning model implemented as the trained artificial intelligence may take the characteristics used for customization and customize the 1-dimensional time-series significance indicators to recommends the frame significance of each frame or set of frames. The customization may recognize that relatively inexperienced clinicians may benefit from knowledge amassed from more experienced clinicians. Similarly, the customization may be used within institutions to standardize image selection practices across different units such as operating rooms and clinician groups. The customization may help inform the user by recommending frames such as those which are typically saved as the most significant. The customization may be settable by a clinician or supervisor, so that the recommendations are based on practices within an institution, or by peers with similar experience levels or practices.

The customization may also be settable by the clinician or supervisor, so that recommendations are made based on types of interventional medical devices being used, types of image sources (e.g., type and manufacturer of an X-ray imaging system), image settings and protocol.

A recommendation system may be trained by the AI training system 180, and provided as trained artificial intelligence implemented by the AI controller 170 or the controller 150. A recommendation system may include a collaborative filtering system which may be used to display frame recommendations in combination with significance scores. Frames may be recommended based solely on user interaction with the images. Alternatively or additionally, frames may be recommended based on user profile information which is comparable to similar users who previously provided selections of images to the AI training system 180. Alternatively or additionally, frames may be recommended based on the equipment being used such as type of interventional medical device or type of the medical imaging system being used.

Figure 2:
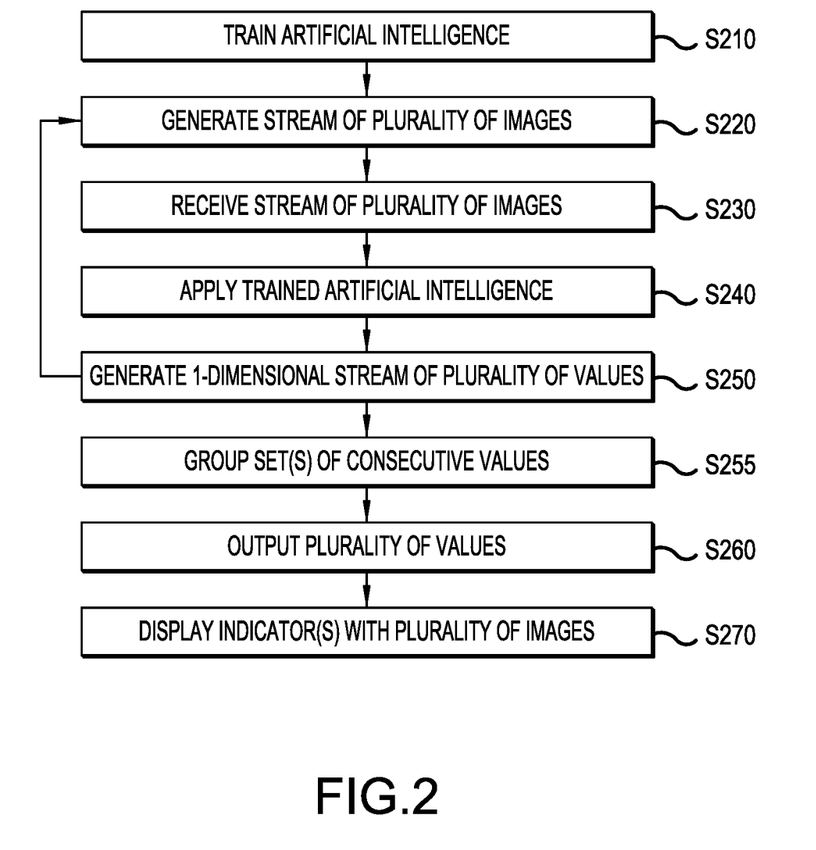
FIG. 2 illustrates a method for image selection for presentation, in accordance with a representative embodiment.

FIG. 2 illustrates a method for image selection for presentation, in accordance with a representative embodiment.

The method of FIG. 2 starts at S210 by training artificial intelligence. The training may be implemented by recursively inputting images for analysis by the artificial intelligence, and then feeding back differences between a ground truth and the output of the artificial intelligence. Training of artificial intelligence is detailed more in the context of FIG. 6 and in the context of FIG. 7. In the embodiment of FIG. 2, artificial intelligence is trained comprehensively before being provided for implementation in the process from S220 to S270. However, in other embodiments, the artificial intelligence may be updated based on operational feedback, such as every 2 or 3 months.

At S220, the method of FIG. 2 includes generating a stream of a plurality of images. The stream of images may be generated by an imaging source such as a medical imaging source, a security camera, a drone camera or another type of source capable of capturing images. For example, the stream of images may be a stream I(t) received from an X-ray imaging system 120 in FIG. 1.

At S230, the stream of the plurality of images are received. The stream of the plurality of images may be the stream I(t) received from the X-ray imaging system 120 in FIG. 1, and may be received by the controller 150 in FIG. 1. The controller 150 may implement a convolutional neural network (CNN)-long short-term memory (LSTM) network that predicts a significance vector $\hat{S}(t)$ for each image of the plurality of images. Alternatively, the CNN-LSTM network may be implemented by a memory/processor combination separate from the controller 250.

At S240, the trained artificial intelligence is applied to the stream of the plurality of images. The trained artificial intelligence may be a deep neural network trained to recognize significance of images, such as artificial intelligence trained by the AI training system 180. The trained artificial intelligence may be implemented by the AI controller 170 or by the controller 150 of the workstation 140 after being trained by the AI training system 180.

At S250, a 1-dimensional stream of a plurality of values is generated. The 1-dimensional stream of the plurality of values is the significance vector $\hat{S}(t)$ generated by the controller 250 or received by the controller 250 from a separate neural network controller. After S250, the process may iteratively return to S220 to wait for the next stream of images to be generated.

At S255, one or more set(s) of consecutive values are grouped. Each group of consecutive images may correspond to an indicator of the 1-dimensional stream of indicators. Alternatively, each image of a group may be indicated by its own indicator of the 1-dimensional stream of indicators. The grouping at S255 creates one or more groups of images that can be represented by thumbnails or other visualizations.

At S260, a plurality of values are output. The plurality of values may be output for display on the monitor 155 in FIG. 1 The plurality of values may be used as the indicators, or may be used to generate visualizations such as a color-coded heat map or icons of different sizes.

At S270, indicators are displayed for a plurality of images. The user interface displayed on the monitor 155 in FIG. 1 may be reconfigured to order one or more image series according to the significance levels, and/or to highlight or enlarge one or more image series with the highest significance. Although not shown in FIG. 2, the method may also include auto-saving and/or auto-flagging of image series/frames or other modes triggered by the values of the significance vector $\hat{S}(t)$.

Figure 3:
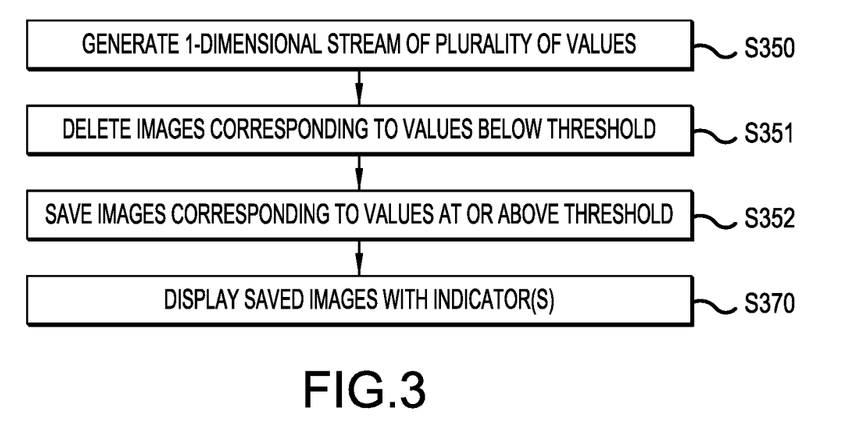
FIG. 3 illustrates another method for image selection for presentation, in accordance with a representative embodiment.

FIG. 3 illustrates another method for image selection for presentation, in accordance with a representative embodiment.

The embodiment of FIG. 3 is complementary with the embodiment of FIG. 2. The method of FIG. 3 may include the steps from S210 to S240 of FIG. 2 before S350 in FIG. 3. Then, at S350, a 1-dimensional stream of a plurality of values is generated. After generating the 1-dimensional stream at S350, the image selection system 100 in FIG. 1 may compare the 1-dimensional values to a predetermined threshold. The predetermined threshold may be adjustable by a user or a system administrator.

At S351, images corresponding to values below the threshold are deleted. At S352, images corresponding to values at or above the threshold are saved. In other words, one or more thresholds may be used to auto-save and auto-delete images based on values in a 1-dimensional stream generated by applying artificial intelligence to a stream of received images. For example, images indicated by a value below a first threshold may be automatically deleted. Images indicated by a values above a second threshold may be automatically stored.

At S370, saved images are displayed with one or more indicator(s). The indicator(s) displayed with the images may include color-coded frames with colors varying according to the values, a heat map corresponding to the values, numerical representations of the numbers corresponding to the values, shapes with sizes corresponding to the values, or any other visualization that enables a user to parse the significance of the corresponding saved images based on the indicator(s).

Figure 4:
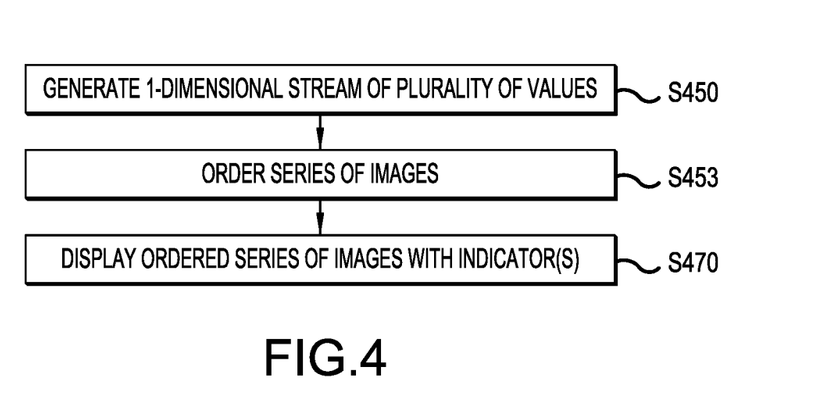
FIG. 4 illustrates another method for image selection for presentation, in accordance with a representative embodiment.

FIG. 4 illustrates another method for image selection for presentation, in accordance with a representative embodiment.

The embodiment of FIG. 4 is complementary with the embodiment of FIG. 2. The method of FIG. 4 may include the steps from S210 to S240 of FIG. 2 before S450 in FIG. 4. Then, at S450, a 1-dimensional stream of a plurality of values is generated. After generating the 1-dimensional stream of the plurality of values, the method of FIG. 4 may include ordering a series of images at S453. The ordering at S453 may include matching indicators from the 1-dimensional stream with the corresponding images, and then automatically deleting images designated by the indicators as insignificant. The remaining images may be grouped in groups. Groups may include sets of consecutive images that include the same or similar subject matter, and may be broken up, for example, by gaps that result from the deletion of images. For example, At S453, the method of FIG. 4 includes ordering the series of images. The series of images are ordered based on the significance of each image in the series of images. The ordering may include grouping one or more sets of at least one consecutive image based on the values corresponding to the one or more sets of at least one consecutive image.

At S470, the ordered series of images are displayed with indicator(s). Indicators may indicate that one or more sets of at least one consecutive image belong to a set indicated by the indicator. As an example, indicators may correspond to a heat map, so that different indicators indicate different levels of significance and are shown by different colors.

Figure 5A:
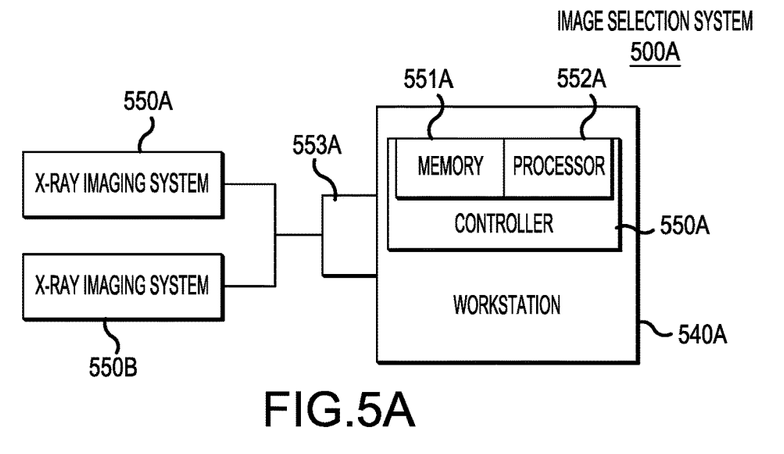
FIG. 5A illustrates another system for image selection for presentation, in accordance with another representative embodiment.

FIG. 5A illustrates another system for image selection for presentation, in accordance with another representative embodiment.

In FIG. 5A, a first X-ray imaging system 550A and a second X-ray imaging system 550B both generate and provide images to a workstation 540A. The workstation 540A may be a centralized workstation within a single facility that includes the first X-ray imaging system 550A and the second X-ray imaging system 550B. Alternatively, workstation 540A may be provided as a third-party service for multiple facilities that separately include the first X-ray imaging system 550A and the second X-ray imaging system 550B. The third-party service may receive images over a communications network, and respond with the 1-dimensional values representing the significance of each image as determined by applying the trained artificial intelligence. Additionally, while FIG. 5A shows two X-ray imaging systems, a system and controller that implement image selection for presentation are not limited to any particular number of image sources. For example, a single facility may include more than two X-ray imaging systems that provide images to a system and controller that implement image selection for presentation.

The workstation 540A may be a system computer that receives a stream of a plurality of images as one of a plurality of streams of images from different sources that include the first X-ray imaging system 550A and the second X-ray imaging system 550B. The workstation 540A either directly applies trained artificial intelligence to the received images, or provides the stream of images to a separate AI controller such as the AI controller 170 shown in FIG. 1.

Additionally, a recommendation system implemented by the workstation 540A or other workstations described herein may be customized for individual users. The recommendation system may be trained according to Collaborative Filtering (CF), or variations of CF including CF neighborhood or CF latent factors methods. The recommendation system may provide recommendations to a clinician by finding previous image sets and resultant 1-dimensional values representing significance of images that are for the most similar users (user-based), or that are for the most similar items (item-based) either in the images or used to generate the images in the previous image sets. For example, a recommendation system may recommend image frames by finding similar users based on previous ratings of or by the similar users. Alternatively or additionally, a recommendation system may recommend image frames by finding similar users based on finding similar frames. Model-based CF may be implemented using singular value decomposition (SVD), principal component analysis (PCA), matrix factorization, or neural networks-based machine learning (deep learning) methods. Alternatively, memory-based CF may be implemented with similarity metrics such as Pearson correlation, Jaccard or cosine distance.

A recommendation system may utilize a multi-dimensional sparse utility matrix $M \in R^{N \times M}$, where M is the number of users (columns) and N is the number of frames or frame clusters (rows) available in a database. The entries of a multi-dimensional sparse utility matrix may be filled in with ratings of images, i.e., 1 if the user flagged the image, 0 if the image was seen by the user but not flagged, blank (empty) if the rating is not available. Ratings may be provided during or after an interventional medical procedure as a part of a current clinical practice. Frame clusters may be used instead of a matrix since a matrix may include very large numbers of images. Frames from different users and clinical sites may be clustered based on the similarity of the subject matter involving the different users and clinical sites. For example, the similarity of the subject matter may be based on a procedure type, devices used, or anatomy of interest to reduce the number of annotations required by a system.

Low-dimensional embedding vectors may be used to cluster frames from a large set of images into smaller subsets according to the similarity of the frames. Clustering may be performed using k-means, Gaussian mixture models-based clustering. Low-dimensional embedding vectors may be generated by flattening or pooling of the last feature maps from a deep convolutional neural network previously trained on the arbitrary task, such as by an auto-encoder. The same methodology may be applied to cluster users in the utility matrix based on their preferences, such as scanning protocols, imaging settings, manufacturer of the X-ray system, clinical experience, and patient throughput, instead of frame similarity.

An example Table for a sparse utility matrix of a user-item recommendation system is provided below. The sparse utility user-item matrix includes preference ratings, with a rating of 1 when a user flags a group of frames, 0 when the user saw the frames but has not flagged the frames, and an empty space when the rating is unavailable.

|  | user cluster $u_1$ | . . . | user cluster $u_m$ |
|---|---|---|---|
| frame cluster $e_1$ | rating $r_{(1,1)}$ | . . . | . . . |
| . . . | . . . | . . . | . . . |
| frame cluster $e_n$ | . . . | . . . | rating $r_{(n,m)}$ |

The user-item recommendation system may include a recommendation engine that functions without explicitly defining the nature of shared preferences. For example, multiple users may be presented with the same set of images, and a correlation between preferences derived from user selections may be used as the basis of recommendations. For example, a first user USER1 may flag similar images to a second user USER2. When the recommendation system detects that the second user USER2 has not flagged an image similar to an image flagged by the first user USER1, the recommendation system may recommend saving the image to the second user USER2. Other sets of users with similar characteristics may be provided with recommendations. Blank entries in the utility matrix may be found using matrix factorization methods such as SVD, unconstrained or non-negative matrix factorization. Alternatively, blank entries in the utility matrix may be identified using machine learning, such as a neural network trained on the task to approximate the rating of the frame based on the user and frame embeddings.

In another embodiment, user characteristics may be used as the basis of recommendations by a recommendation system. The user characteristics may include characteristics of the image source, such as a type of X-ray imaging system being used including model, year of purchase, configuration and applications installed thereon. User characteristics may also include characteristics of an institution where the user works, such as a teaching hospital, community hospital, or office-based laboratory. User characteristics may also include a type of clinician, such as years of experience, or type of clinician such as interventional radiologist, interventional cardiologist, vascular surgeon, or interventional oncologist. User characteristics may also include types of procedure being performed when the images are captured, such as electrophysiology ablation or percutaneous coronary intervention (PCI) or structural heart disease (SHD) valve repair. Types of procedure may also include information of a risk or frequency of procedure. User characteristics may also include a type of patient, such as adult or pediatric, diagnosis, age and gender. The user characteristics may be represented as multi-dimensional embedding vectors used to train a recommendation system. Similarities between user-centric embedding vectors may be calculated using, for example, normalized cross-correlation, SSD, template matching or Siamese convolutional neural networks.

Figure 5B:
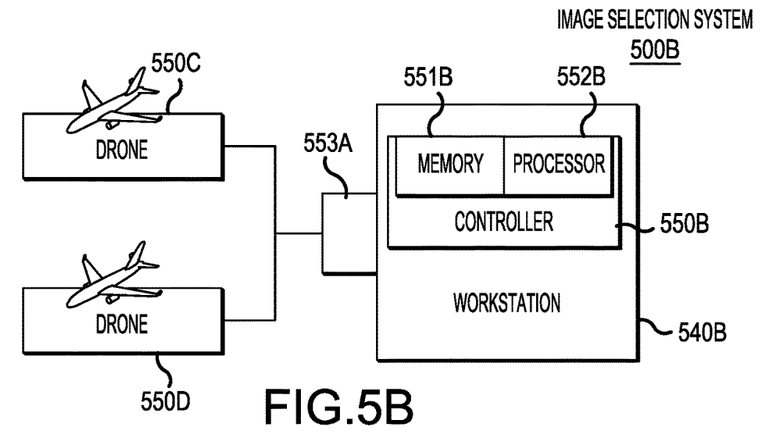
FIG. 5B illustrates another system for image selection for presentation, in accordance with a representative embodiment.

FIG. 5B illustrates another system for image selection for presentation, in accordance with a representative embodiment.

In FIG. 5B, a first drone 550C and a second drone 550D both generate and provide images to a workstation 540B.

Examples of images from the first drone 550C and the second drone 550D may be images of utility infrastructure, such as pipelines or overhead powerlines. A central controller may receive the images and rate the images based on whether the utility infrastructure in the images appears to have a problem, such as a hole in a pipeline, a leak from the pipeline, an overhead wire that is knocked down by a tree or that is on the ground for any reason.

In an embodiment, trained artificial intelligence may be provided on the first drone 550C and the second drone 550D, to dynamically analyze images to determine which images should be saved and which images should be deleted. Images which are confirmed to be insignificant may be automatically deleted based on having a value below a first threshold. Images which are confirmed to be significant based on having a value above a second threshold may be automatically saved or sent to the external server. Storing or sending only the most significant frames may spare storage media capacity or reduce connection bandwidth. Images with indicators between the first threshold and the second threshold may be held for a determination by an operator. In another embodiment, trained artificial intelligence may be provided on the first drone 550C and the second drone 550D, and may analyze live views from cameras to determine when images should be captured by the cameras and saved.

Figure 5C:
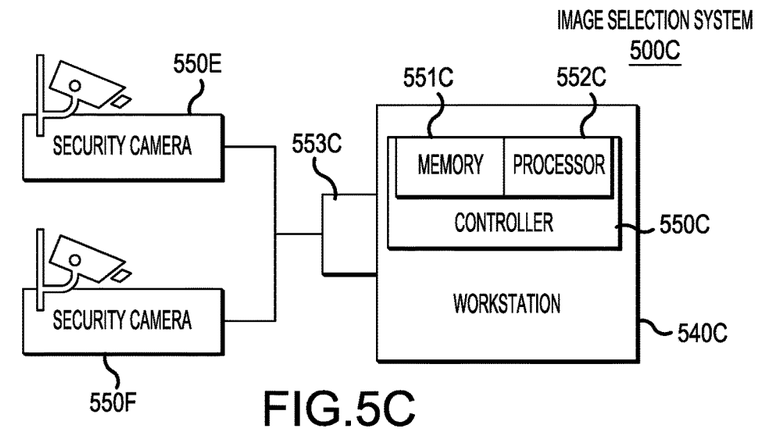
FIG. 5C illustrates another system for image selection for presentation, in accordance with a representative embodiment.

FIG. 5C illustrates another system for image selection for presentation, in accordance with a representative embodiment.

In FIG. 5C, a first security camera 550E and a second security camera 550F both generate and provide images to a workstation 540C. The first security camera 550E and the second security camera 550F may be representative of dozens, hundreds or thousands of security cameras that provide security images to a central controller that analyzes the security images and determines which security images to save and which security images to delete. For example, a central controller may be configured to save any images with a human present when the central controller does not expect to receive images with humans present except when unauthorized humans are present. Alternatively, a central controller may be configured to recognize humans wearing a particular uniform and rate such images with an intermediate rating, and to rate images with a human present but not wearing the particular uniform with a high rating. Images with no human present may be rated at the lowest rating.

Figure 6:
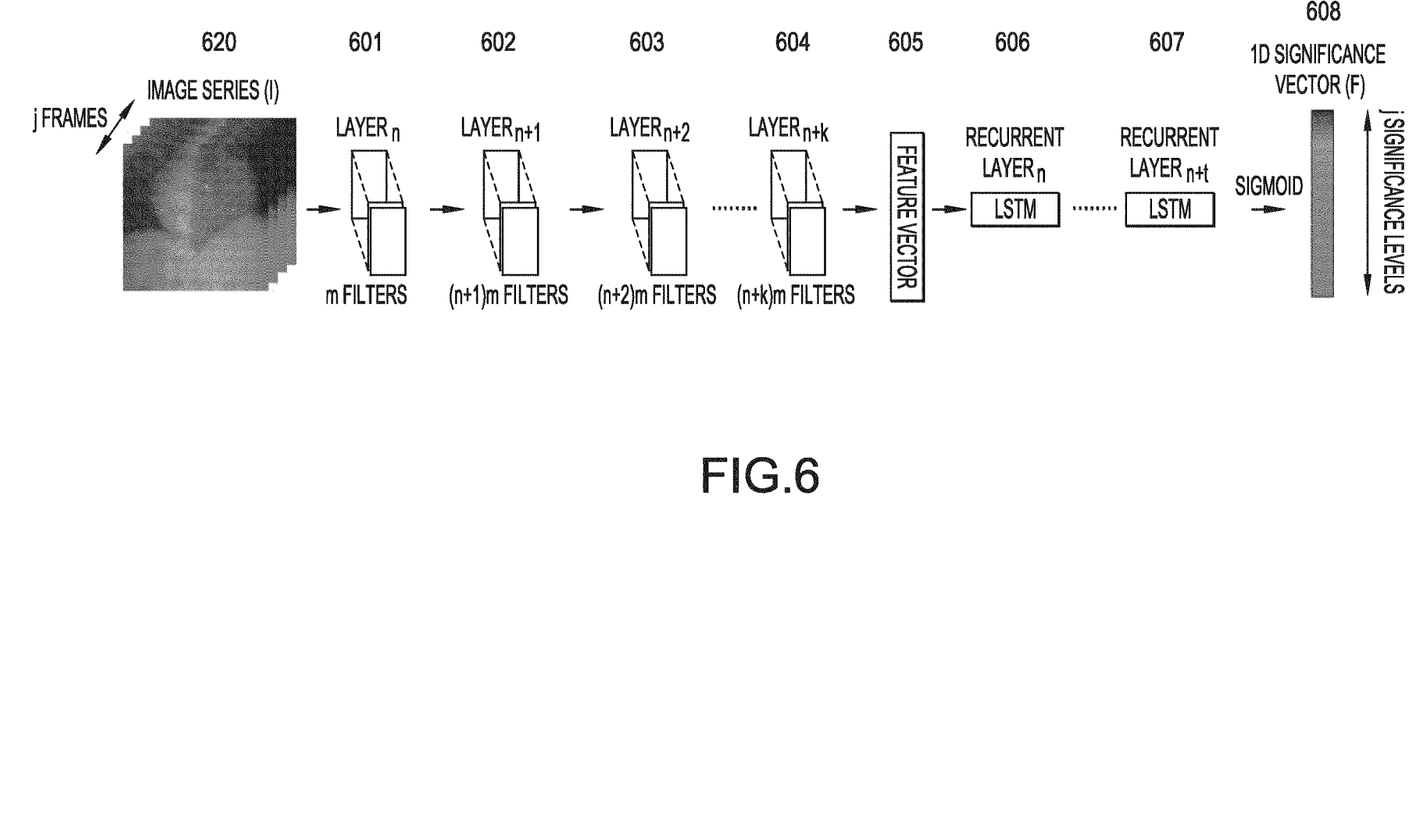
FIG. 6 illustrates an artificial intelligence process for image selection for presentation, in accordance with a representative embodiment.

FIG. 6 illustrates an artificial intelligence process for image selection for presentation, in accordance with a representative embodiment.

In FIG. 6, a series of input images (I) with j frames are input to artificial intelligence with multiple layers. In FIG. 6, the artificial intelligence is a deep recurrent neural network (many-to-many) predicts a significance level for each frame input as a sequence of consecutive image frames.

The j frames 620 of the image series are first input to layer$_n$ and m filters 601, which provides output to layer$_{n+1}$ and (n+1)m filters 602, which provided output to layer$_{n+2}$ and (n+2)m filters 603, which provides output to layer$_{n+k}$ and (n+k)m filters 604. The output from the layer$_{n+k}$ and (n+k)m filters 604 is provided to the feature vector or set of feature vectors 605. Single or plurality of feature vectors 605 are provided to the recurrent layer$_n$ LSTM 606. The output from the recurrent layer$_n$ LSTM 606 is provided to the recurrent layer$_{n+2}$ LSTM 607. The output from the recurrent layer$_{n+2}$ LSTM 607 is provided as a sigmoid of the 1-dimensional vector (F).

The neural network in FIG. 6 may be implemented by a neural network controller that is configured to receive sequences of images. The neural network may be trained to regress a 1-dimensional significance vector given an input sequence consisting of X-ray frames. The 1-dimensional significance vector may be output as one significance value per frame. The values may range from 0 to 1, from 0 to 4, from 1 to 4, or by any other range that will reflect differences in significance of different frames. The neural network in FIG. 6 includes one or more intermediate layers. The number of intermediate layers may vary depending on the complexity of the task of rating significance of the frames. Each layer contains a convolution operation, batch normalization, non-linear activation, and/or spatial pooling. The resulting multi-dimensional feature map—or sequence of feature maps—generated by intermediate layers in FIG. 6 is converted to a single or sequence of low-dimensional embeddings, using for instance global average pooling, and fed into the recurrent layers, such as long-short-term-memory (LSTM) or gated recurrent units (GRU), or similar. The recurrent layers are followed by a regression layer with a sigmoid activation function that estimates a 1-dimensional significance vector. The neural network thus generates a 1-dimensional sequence of frame significance.

The training of the neural network in FIG. 6 may be performed by a training data controller. The training data controller may be configured to obtain and store a large dataset of X-ray image series as well as trial/registry reporting values. The training dataset may be acquired from a large and variable patient population. The patient population represented in the training dataset may include patients with varying anatomical features, disease severity, disease location, gender, age, and medical history.

Given this dataset, the training data controller may generate random batches of training instances. Each training instance consists of a 2-tuple $d_i$: where: $d_i = I_i F_i$ wherein $I_i$ represents the time-series of 2-dimensional fluoroscopy images acquired during the interventional procedure and Fi represents a time-series flagging value that indicates whether the frame was flagged for saving (1) or not (0) for that image. Alternatively, Fi may be an average across many clinicians labelling data retrospectively with whether or not that frame should be flagged. In such case scalars in the 1-dimensional significance vector may be from 0 to 1.

The training data controller may train the deep neural network using generated batches of training instances. At each training iteration a batch of time-series fluoroscopy images—randomly sampled from training data set—may be sent as input; and the deep neural network predicts a batch time-series significance vector. The batch time-series significance vector may be compared with the ground-truth significance vector using a predefined loss function. The predefined loss function may be a mean square error (MSE) as an example. Weights of the network may be updated by back-propagating errors between predicted and ground-truth significance vectors.

Figure 7:
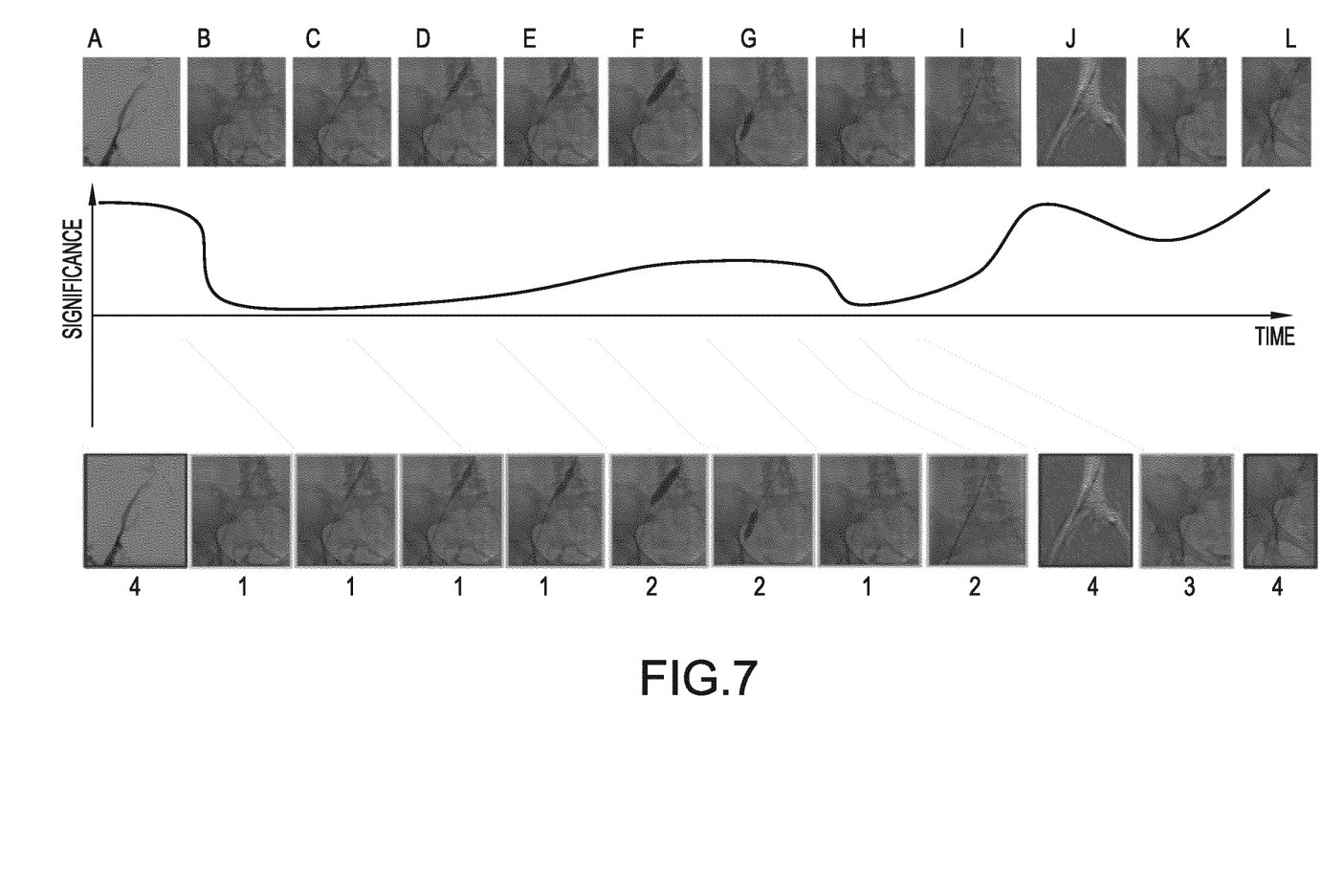
FIG. 7 illustrates another artificial intelligence process for image selection for presentation, in accordance with a representative embodiment.

FIG. 7 illustrates another artificial intelligence process for image selection for presentation, in accordance with a representative embodiment.

FIG. 7 shows sample fluoroscopy frames in a peripheral venous stenting case. An example image sequence is shown in the top row of frames. The frame significance rating is shown in the middle, and an example heat-map visualization is shown at the bottom row of frames. For the bottom row of frames, a number is assigned below each frame. The frames may also each be outlined in a color corresponding to the numbers. For example, for the bottom row of frames in FIG. 7, the number 4 may correspond to a red outline for a high significance, the number 3 may correspond to a gold outline for the next highest significance, the number 2 may correspond to a yellow outline for the second lowest significance, and the number 1 may correspond to a green outline for the lowest significance.

Figure 8:
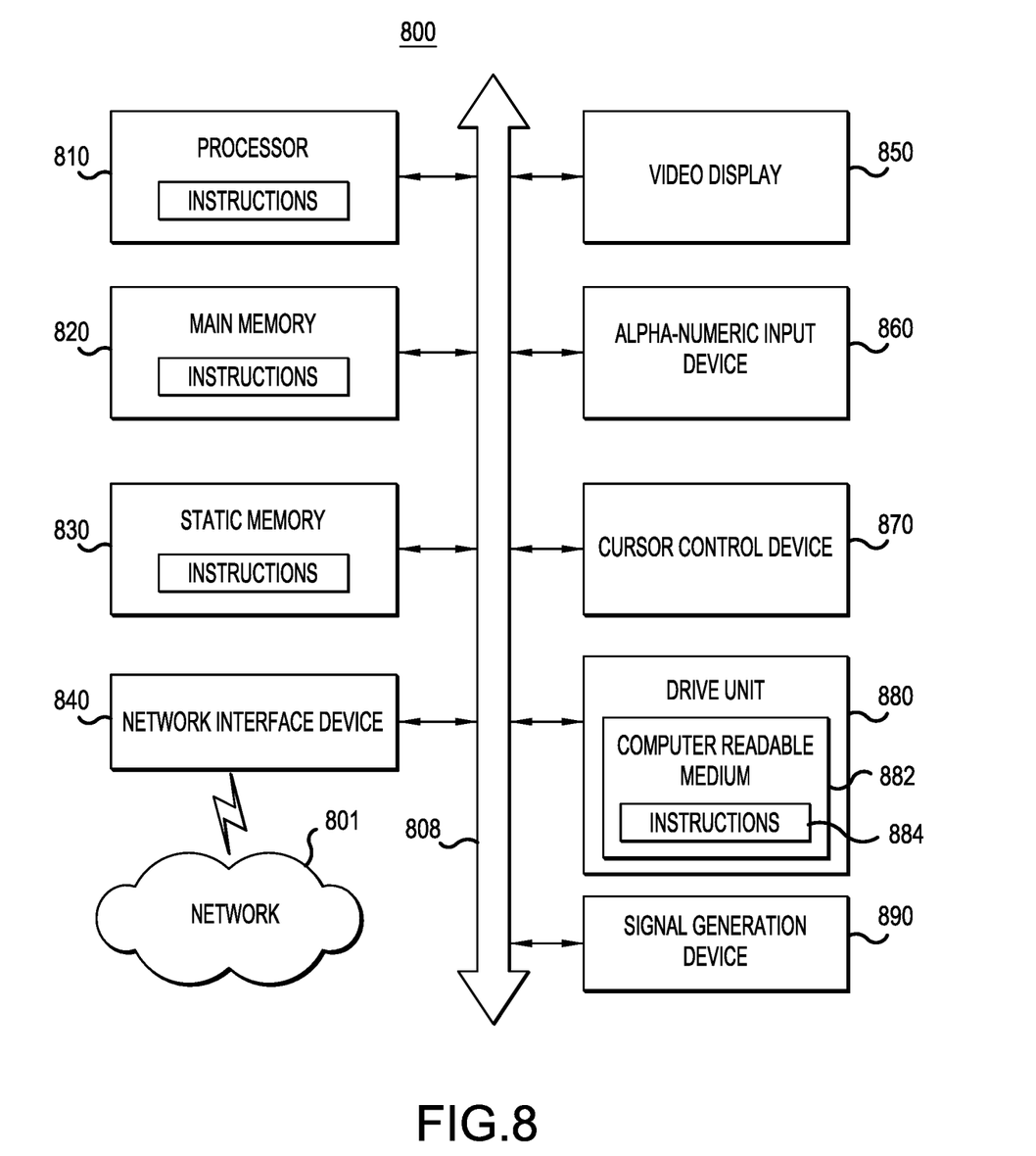
FIG. 8 illustrates a computer system, on which a method for image selection for presentation is implemented, in accordance with another representative embodiment.

FIG. 8 illustrates a computer system, on which a method for image selection for presentation is implemented, in accordance with another representative embodiment.

The computer system 800 of FIG. 8 shows a complete set of components for a communications device or a computer device. However, a "controller" as described herein may be implemented with less than the set of components of FIG. 8, such as by a memory and processor combination. The computer system 800 may include some or all elements of one or more component apparatuses in a system for image selection for presentation herein, although any such apparatus may not necessarily include one or more of the elements described for the computer system 800 and may include other elements not described.

Referring to FIG. 8, the computer system 800 includes a set of software instructions that can be executed to cause the computer system 800 to perform any of the methods or computer-based functions disclosed herein. The computer system 800 may operate as a standalone device or may be connected, for example, using a network 801, to other computer systems or peripheral devices. In embodiments, a computer system 800 performs logical processing based on digital signals received via an analog-to-digital converter.

In a networked deployment, the computer system 800 operates in the capacity of a server or as a client user computer in a server-client user network environment, or as a peer computer system in a peer-to-peer (or distributed) network environment. The computer system 800 can also be implemented as or incorporated into various devices, such as the controller 150 in FIG. 1, a stationary computer, a mobile computer, a personal computer (PC), a laptop computer, a tablet computer, or any other machine capable of executing a set of software instructions (sequential or otherwise) that specify actions to be taken by that machine. The computer system 800 can be incorporated as or in a device that in turn is in an integrated system that includes additional devices. In an embodiment, the computer system 800 can be implemented using electronic devices that provide voice, video or data communication. Further, while the computer system 800 is illustrated in the singular, the term "system" shall also be taken to include any collection of systems or sub-systems that individually or jointly execute a set, or multiple sets, of software instructions to perform one or more computer functions.

As illustrated in FIG. 8, the computer system 800 includes a processor 810. The processor 810 may be considered a representative example of the processor 152 of the controller 150 in FIG. 1 and executes instructions to implement some or all aspects of methods and processes described herein. The processor 810 is tangible and non-transitory. As used herein, the term "non-transitory" is to be interpreted not as an eternal characteristic of a state, but as a characteristic of a state that will last for a period. The term "non-transitory" specifically disavows fleeting characteristics such as characteristics of a carrier wave or signal or other forms that exist only transitorily in any place at any time. The processor 810 is an article of manufacture and/or a machine component. The processor 810 is configured to execute software instructions to perform functions as described in the various embodiments herein. The processor 810 may be a general-purpose processor or may be part of an application specific integrated circuit (ASIC). The processor 810 may also be a microprocessor, a microcomputer, a processor chip, a controller, a microcontroller, a digital signal processor (DSP), a state machine, or a programmable logic device. The processor 810 may also be a logical circuit, including a programmable gate array (PGA), such as a field programmable gate array (FPGA), or another type of circuit that includes discrete gate and/or transistor logic. The processor 810 may be a central processing unit (CPU), a graphics processing unit (GPU), a tensor processing unit (TPU) or both. Additionally, any processor described herein may include multiple processors, parallel processors, or both. Multiple processors may be included in, or coupled to, a single device or multiple devices.

The term "processor" as used herein encompasses an electronic component able to execute a program or machine executable instruction. References to a computing device comprising "a processor" should be interpreted to include more than one processor or processing core, as in a multi-core processor. A processor may also refer to a collection of processors within a single computer system or distributed among multiple computer systems. The term computing device should also be interpreted to include a collection or network of computing devices each including a processor or processors. Programs have software instructions performed by one or multiple processors that may be within the same computing device or which may be distributed across multiple computing devices.

The computer system 800 further includes a main memory 820 and a static memory 830, where memories in the computer system 800 communicate with each other and the processor 810 via a bus 808. Either or both of the main memory 820 and the static memory 830 may be considered representative examples of the memory 151 of the controller 150 in FIG. 1, and store instructions used to implement some or all aspects of methods and processes described herein. Memories described herein are tangible storage mediums for storing data and executable software instructions and are non-transitory during the time software instructions are stored therein. As used herein, the term "non-transitory" is to be interpreted not as an eternal characteristic of a state, but as a characteristic of a state that will last for a period. The term "non-transitory" specifically disavows fleeting characteristics such as characteristics of a carrier wave or signal or other forms that exist only transitorily in any place at any time. The main memory 820 and the static memory 830 are articles of manufacture and/or machine components. The main memory 820 and the static memory 830 are computer-readable mediums from which data and executable software instructions can be read by a computer (e.g., the processor 152). Each of the main memory 820 and the static memory 830 may be implemented as one or more of random access memory (RAM), read only memory (ROM), flash memory, electrically programmable read only memory (EPROM), electrically erasable programmable read-only memory (EEPROM), registers, a hard disk, a removable disk, tape, compact disk read only memory (CD-ROM), digital versatile disk (DVD), floppy disk, blu-ray disk, or any other form of storage medium known in the art. The memories may be volatile or non-volatile, secure and/or encrypted, unsecure and/or unencrypted.

"Memory" is an example of a computer-readable storage medium. Computer memory is any memory which is directly accessible to a processor. Examples of computer memory include, but are not limited to RAM memory, registers, and register files. References to "computer memory" or "memory" should be interpreted as possibly being multiple memories. The memory may for instance be multiple memories within the same computer system. The memory may also be multiple memories distributed amongst multiple computer systems or computing devices.

As shown, the computer system 800 further includes a video display unit 850, such as a liquid crystal display (LCD), an organic light emitting diode (OLED), a flat panel display, a solid-state display, or a cathode ray tube (CRT), for example. Additionally, the computer system 800 includes an input device 860, such as a keyboard/virtual keyboard or touch-sensitive input screen or speech input with speech recognition, and a cursor control device 870, such as a mouse or touch-sensitive input screen or pad. The computer system 800 also optionally includes a disk drive unit 880, a signal generation device 890, such as a speaker or remote control, and/or a network interface device 840.

In an embodiment, as depicted in FIG. 8, the disk drive unit 880 includes a computer-readable medium 882 in which one or more sets of software instructions 884 (e.g., software) are embedded. The sets of software instructions 884 are read from the computer-readable medium 882 to be executed by the processor 810. Further, the software instructions 884, when executed by the processor 810, perform one or more steps of the methods and processes as described herein. In an embodiment, the software instructions 884 reside all or in part within the main memory 820, the static memory 830 and/or the processor 152 during execution by the computer system 800. Further, the computer-readable medium 882 may include software instructions 884 or receive and execute software instructions 884 responsive to a propagated signal, so that a device connected to a network 801 communicates voice, video or data over the network 801. The software instructions 884 may be transmitted or received over the network 801 via the network interface device 840.

In an embodiment, dedicated hardware implementations, such as application-specific integrated circuits (ASICs), field programmable gate arrays (FPGAs), programmable logic arrays and other hardware components, are constructed to implement one or more of the methods described herein.

One or more embodiments described herein may implement functions using two or more specific interconnected hardware modules or devices with related control and data signals that can be communicated between and through the modules. Accordingly, the present disclosure encompasses software, firmware, and hardware implementations. Nothing in the present application should be interpreted as being implemented or implementable solely with software and not hardware such as a tangible non-transitory processor and/or memory.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing may implement one or more of the methods or functionalities as described herein, and a processor described herein may be used to support a virtual processing environment.

Accordingly, image selection for presentation enables automatic saving of images such as medical images produced during an interventional medical procedure. The auto-saving may be selectively implemented so that large volumes of images are not all saved, and a large time-series of image data collected during the interventional X-ray procedures does not require manual review in order to identify and save the most significant medical images. Nevertheless, image selection for presentation is not limited as an application to specific details described herein, and instead is applicable to additional embodiments in which other medical imaging modes such as including intravenous ultrasound are the source of a volume of images to be subjected to artificial intelligence. As noted for several embodiments above, image selection for presentation may be applied to images from a variety of different sources other than medical imaging, including security camera images, drone images, and other types of image sources.

Although image selection for presentation has been described with reference to several exemplary embodiments, it is understood that the words that have been used are words of description and illustration, rather than words of limitation. Changes may be made within the purview of the appended claims, as presently stated and as amended, without departing from the scope and spirit of image selection for presentation in its aspects. Although image selection for presentation has been described with reference to particular means, materials and embodiments, image selection for presentation is not intended to be limited to the particulars disclosed; rather image selection for presentation extends to all functionally equivalent structures, methods, and uses such as are within the scope of the appended claims.

The illustrations of the embodiments described herein are intended to provide a general understanding of the structure of the various embodiments. The illustrations are not intended to serve as a complete description of all of the elements and features of the disclosure described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The preceding description of the disclosed embodiments is provided to enable any person skilled in the art to practice the concepts described in the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents and shall not be restricted or limited by the foregoing detailed description.

We claim:

1. A system for selecting images of an interventional medical procedure, the system comprising:
   a controller comprising a memory configured to store instructions and a processor configured to execute the instructions, and when executed by the processor, the instructions cause the controller to:
   receive a stream of a plurality of images from an imaging system;
   generate, based on system information of the imaging system and procedure information of the interventional medical procedure, a 1-dimensional stream of a plurality of values corresponding respectively to the plurality of images, each of the plurality of values of the 1-dimensional stream indicating a significance of a corresponding image of the plurality of images to the interventional medical procedure;
   automatically save or automatically flag frames having a value indicating most significant frames, and rejecting frames having a value indicating least significant frames; and
   display, with one or more of the saved or automatically flagged image frames, one or more visual indicators corresponding to the values that enable a user to determine the significance of the corresponding saved image frames based on the one or more visual indicators.

2. The system of claim 1, wherein, when executed by the processor, the instructions further cause the controller to:
   apply a trained artificial intelligence model to the plurality of images to generate the plurality of values indicating the significance of the corresponding plurality of images, the trained artificial intelligence model trained to predict significance values for images of interventional medical procedures based on imaging system information and procedural information of the interventional medical procedures.

3. The system of claim 1, further comprising:
   the imaging system configured to generate the plurality of images during the interventional medical procedure and provide the stream of the plurality of images to the controller during the interventional medical procedure.

4. The system of claim 1, wherein, when executed by the processor, the instructions further cause the controller to:
   receive the stream of a plurality of images as one of a plurality of streams of images from different sources that generate the plurality of streams of images.

5. The system of claim 1, wherein the system information of the imaging system includes at least one of imaging system position, radiation setting, exposure settings, digital subtraction angiography (DSA) information, and table position.

6. The system of claim 1, wherein the most significant frames have a value greater than a predetermined threshold, and the least significant frames have a value less that the predetermined threshold.

7. The system of claim 6, wherein the predetermined threshold is adjustable and/or may comprise more than one predetermined threshold.

8. The system of claim 1, wherein the visual indicators of values comprise one or more of: color-coded frames with colors varying according to the values, a heat map corresponding to the values, numerical representations of the numbers corresponding to the values, shapes with sizes corresponding to the values.

9. A system for selecting images of an interventional medical procedure, the system comprising:
   a controller comprising a memory configured to store instructions and a processor configured to execute the instructions, and when executed by the processor, the instructions cause the controller to:
   receive a stream of a plurality of images from an imaging system;
   generate, based on system information of the imaging system and procedure information of the interventional medical procedure, a 1-dimensional stream of a plurality of values corresponding respectively to the plurality of images, each of the plurality of values of the 1-dimensional stream indicating a significance of a corresponding image of the plurality of images to the interventional medical procedure;
   select one or more of the plurality of images based on the corresponding plurality of values; and
   an interface configured to display, with the selected one or more of a the plurality of images, visual representations of the 1-dimensional stream of the plurality of values adjusted on the interface based on indicators of values representing a significance of an image frame.

10. The system of claim 9, wherein the indicators are used to display a only a most significant frame, and reject a least significant frame.

11. The system of claim 9, wherein, when executed by the processor, the instructions further cause the controller to:
apply a trained artificial intelligence model to the plurality of images to generate the plurality of values indicating the significance of the corresponding plurality of images, the trained artificial intelligence model trained to predict significance values for images of interventional medical procedures based on imaging system information and procedural information of the interventional medical procedures.

12. The system of claim 9, wherein the imaging system is configured to generate the plurality of images during the interventional medical procedure and provide the stream of the plurality of images to the controller during the interventional medical procedure.

13. The system of claim 9, wherein, when executed by the processor, the instructions further cause the controller to:
receive the stream of a plurality of images as one of a plurality of streams of images from different sources that generate the plurality of streams of images.

14. A tangible, non-transitory computer-readable medium that stores instructions, which when executed by a processor, cause the processor to:
receive a stream of a plurality of images from an imaging system;
generate, based on system information of the imaging system and procedure information of the interventional medical procedure, a 1-dimensional stream of a plurality of values corresponding respectively to the plurality of images, each of the plurality of values of the 1-dimensional stream indicating a significance of a corresponding image of the plurality of images to the interventional medical procedure; and
automatically save or automatically flag frames having a value indicating most significant frames, and rejecting frames having a value indicating least significant frames; and
display, with one or more of the plurality of saved or automatically flagged image frames, one or more visual indicators corresponding to the values that enable a user to determine the significance of the corresponding saved image frames based on the one or more visual indicators.

15. The tangible, non-transitory computer-readable medium of claim 14, wherein the instructions further cause the processor to:
group, based on the plurality of values of the 1-dimensional stream, one or more sets of at least one consecutive image based on the values corresponding to the one or more sets of at least one consecutive image; and
display, for each set of the one or more sets of at least one consecutive image, an indicator indicating that the one or more sets of at least one consecutive image belong to a set indicated by the indicator.

16. The tangible, non-transitory computer-readable medium of claim 14, wherein the instructions further cause the processor:
automatically delete at least one of the plurality of the images indicated by a value below a first threshold; and
automatically storing at least one of the plurality of the images indicated by a value above a second threshold.

17. The tangible, non-transitory computer-readable medium of claim 14, wherein the instructions further cause the processor to: customize the values in the plurality of values of the 1-dimensional stream.

18. The tangible, non-transitory computer-readable medium of claim 14, wherein the instructions further cause the processor to:
change a user interface in accordance with the significance of the plurality of images.

19. The tangible, non-transitory computer-readable medium of claim 14, wherein the instructions further cause the processor to:
apply a trained artificial intelligence model to generate the plurality of values indicating the significance of the corresponding plurality of images, the trained artificial intelligence model trained to predict significance values for images of interventional medical procedures based on imaging system information and procedural information of the interventional medical procedures.

20. The tangible, non-transitory computer-readable medium of claim 14, wherein the visual indicators of values comprise one or more of: color-coded frames with colors varying according to the values, a heat map corresponding to the values, numerical representations of the numbers corresponding to the values, shapes with sizes corresponding to the values.

* * * * *